United States Patent
Rashid et al.

[19]

[11] Patent Number: 6,123,211
[45] Date of Patent: Sep. 26, 2000

[54] MULTILAYER PLASTIC CONTAINER AND METHOD OF MAKING THE SAME

[75] Inventors: A. B. M. Bazlur Rashid, Neenah; Kevin James Curie, Appleton; Patrick Carl Bushman, Neenah; Michael Lewis Wampler, Menasha, all of Wis.

[73] Assignee: American National Can Company, Chicago, Ill.

[21] Appl. No.: 08/949,340

[22] Filed: Oct. 14, 1997

[51] Int. Cl.[7] .................................................. B65D 23/02
[52] U.S. Cl. .......................................... 215/12.1; 215/12.2
[58] Field of Search ................................... 215/12.1, 12.2

[56] References Cited

U.S. PATENT DOCUMENTS

| | | |
|---|---|---|
| 4,511,528 | 4/1985 | Kudert . |
| 4,535,901 | 8/1985 | Okudaira et al. ...................... 215/12.2 |
| 4,550,043 | 10/1985 | Beck ..................................... 215/12.2 |
| 4,743,479 | 5/1988 | Nakamura et al. ................. 215/12.2 X |
| 4,780,257 | 10/1988 | Beck . |
| 4,781,954 | 11/1988 | Krishnakumar et al. .......... 215/12.2 X |
| 4,847,129 | 7/1989 | Collette et al. ..................... 215/12.2 X |
| 4,868,026 | 9/1989 | Shimizu et al. .................... 215/12.2 X |
| 4,889,752 | 12/1989 | Beck . |
| 4,927,679 | 5/1990 | Beck . |
| 4,946,365 | 8/1990 | Kudert . |
| 4,990,301 | 2/1991 | Krishnakumar et al. . |
| 5,320,889 | 6/1994 | Bettle, III .......................... 215/12.2 X |
| 5,464,106 | 11/1995 | Slat et al. ............................... 215/12.1 |
| 5,599,598 | 2/1997 | Valyi .................................. 215/12.2 X |
| 5,645,183 | 7/1997 | Slat et al. ........................... 215/12.1 X |
| 5,674,448 | 10/1997 | Slat et al. ................................. 264/513 |
| 5,693,283 | 12/1997 | Fehan ................................. 215/12.1 X |

FOREIGN PATENT DOCUMENTS 61-203332  9/1986  Japan ................................... 215/12.2

OTHER PUBLICATIONS

English language translation of Japanese Patent No. 61–203,332.

*Primary Examiner*—Sue A. Weaver
*Attorney, Agent, or Firm*—McDermott, Will & Emery

[57] ABSTRACT

The multilayer plastic container comprises a neck portion, a body portion, adjacent the neck portion, forming a cylindrical wall, and a bottom portion adjacent the body portion and opposite the neck portion. The cylindrical wall comprises a first layer of PET, a layer of EVOH adjacent the first layer of PET and a second layer of PET adjacent the layer of EVOH the EVOH has an average thickness which is greater near the neck portion of the container than near the bottom portion of the container.

5 Claims, 3 Drawing Sheets

MULTILAYER PLASTIC CONTAINER AND METHOD OF MAKING THE SAME

BACKGROUND OF THE INVENTION

1. Field of the Invention

This invention relates generally to multilayer plastic containers. More specifically, the invention relates to improved multilayer plastic containers having at least three layers, one of the layers providing oxygen and $CO_2$ barrier protection, which are useful for holding and storing beverages.

2. Background Art

Multilayer containers having a layer of oxygen barrier material such as EVOH are well known in the art. EVOH also provides a $CO_2$ barrier protection which is useful for storing and holding carbonated beverages. Such multilayer containers are blown from preforms. The preforms are manufactured by a multilayer injection molding process such as the process described generally in U.S. Pat. No. 4,511,528, which is incorporated by reference herein. One problem in manufacturing such injection molded preforms is the control of the flow of various materials.

It is desirable to make containers having an inner and outer layer of PET and a middle layer of EVOH for products requiring oxygen and $CO_2$ barrier protection such as carbonated beverages. EVOH is a relatively expensive material and is much more expensive than the PET used to make the inner and outer layers of the container. Accordingly, multilayer containers having a layer of EVOH for oxygen and $CO_2$ barrier protection have generally only been used with products that require a relatively thin layer of EVOH, approximately 0.5 to 1 mils. The preforms from which these generally known containers are made have a layer of EVOH of approximately 4–10 mils.

Containers having thicker layers of EVOH, approximately 2–3 mils, are generally thought to be cost prohibitive when compared with other types of containers due to the cost of the EVOH. Preforms for making such containers must contain a layer of EVOH which is approximately 20–30 mils thick. Additionally, the difficulty of controlling such relatively thicker layers of EVOH is more difficult than controlling relatively thin layers of EVOH. If the EVOH flow is not accurately controlled in making the preform, the layer of EVOH is not evenly distributed in the blown container. Thus, the EVOH may become exposed to the inner or outer surfaces of the bottle. If EVOH is exposed to either of these surfaces, expensive EVOH is wasted. Furthermore if EVOH is exposed to the inner or outer surfaces of the containers the EVOH can flake away from the bottle creating an undesirable appearance for a consumer. Additionally, if the EVOH is unevenly distributed around the bottom profile of the container, it can cause weaknesses in the bottom profile which can make the bottle unstable and subject to deformation from internal pressures.

SUMMARY OF THE INVENTION

It is one of the principal objectives of the present invention to provide a multilayer plastic bottle having a layer of EVOH, to provide oxygen and $CO_2$ barrier protection, that is approximately 2–3 mils thick.

It is another object of the invention to provide a multilayer plastic bottle having a middle layer of EVOH that has a varying thickness whereby the thickness of the EVOH layer has an even distribution of EVOH throughout the top and middle sections of the body of the bottle and which tapers from the middle section of the bottle to a thinner layer of EVOH at the bottom of the bottle.

It is another object of the present invention to provide a process for making a multilayer preform, which can be used to make a multilayer bottle, having a middle layer of EVOH that has a varying thickness whereby the thickness of the EVOH layer is evenly distributed throughout the top and middle of the body of the preform and tapers to a thinner layer of EVOH near the bottom of the preform.

It is still another object of the invention to provide a plastic bottle that is cost effective and provides good oxygen and $CO_2$ barrier protection.

It is a further object of the invention to provide a container which provides improved ultra violet light protection for materials filled in the container.

It is still further an object of the invention to provide a bottle that has a thick layer of EVOH protection and still has a good, strong bottom profile.

DETAILED DESCRIPTION OF THE DRAWINGS

Figure 1:
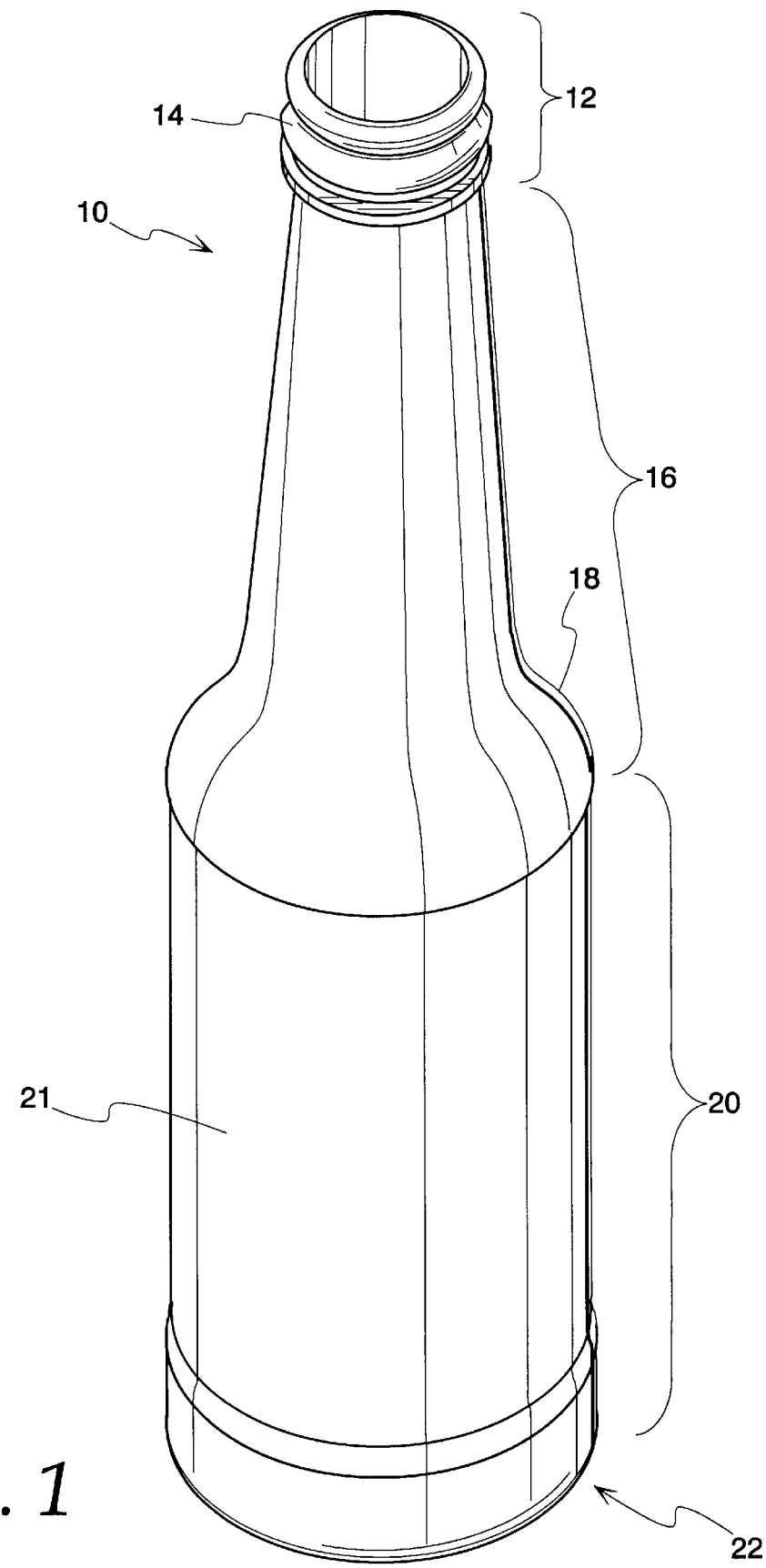
FIG. 1 is a perspective view of a multilayer container according to the present invention.

Referring now to FIG. 1, there is shown a multilayer plastic container, specifically a bottle 10, according to the teaching of the present invention. The bottle 10 has a top end 12 which has a crown finish 14 for receiving a crown closure (not shown) which seals the bottle 10 after it has been filled. Beneath the top end 12 of the bottle 10 is a tapered neck portion 16. The tapered neck portion 16 is thinner near the top end 12 of the bottle 10 and widens as is goes down. The neck portion 16 is adjacent a rounded shoulder 18 that rounds into a body portion 20 of the bottle 10. The body portion 20 forms a cylindrical wall 21. A bottom end 22 of the bottle 10 is adjacent the body portion 20 of the bottle 10. The bottom end 22 has a profile (See FIG. 2) that is designed to withstand internal pressure from a carbonated beverage.

Figures 2, 3:
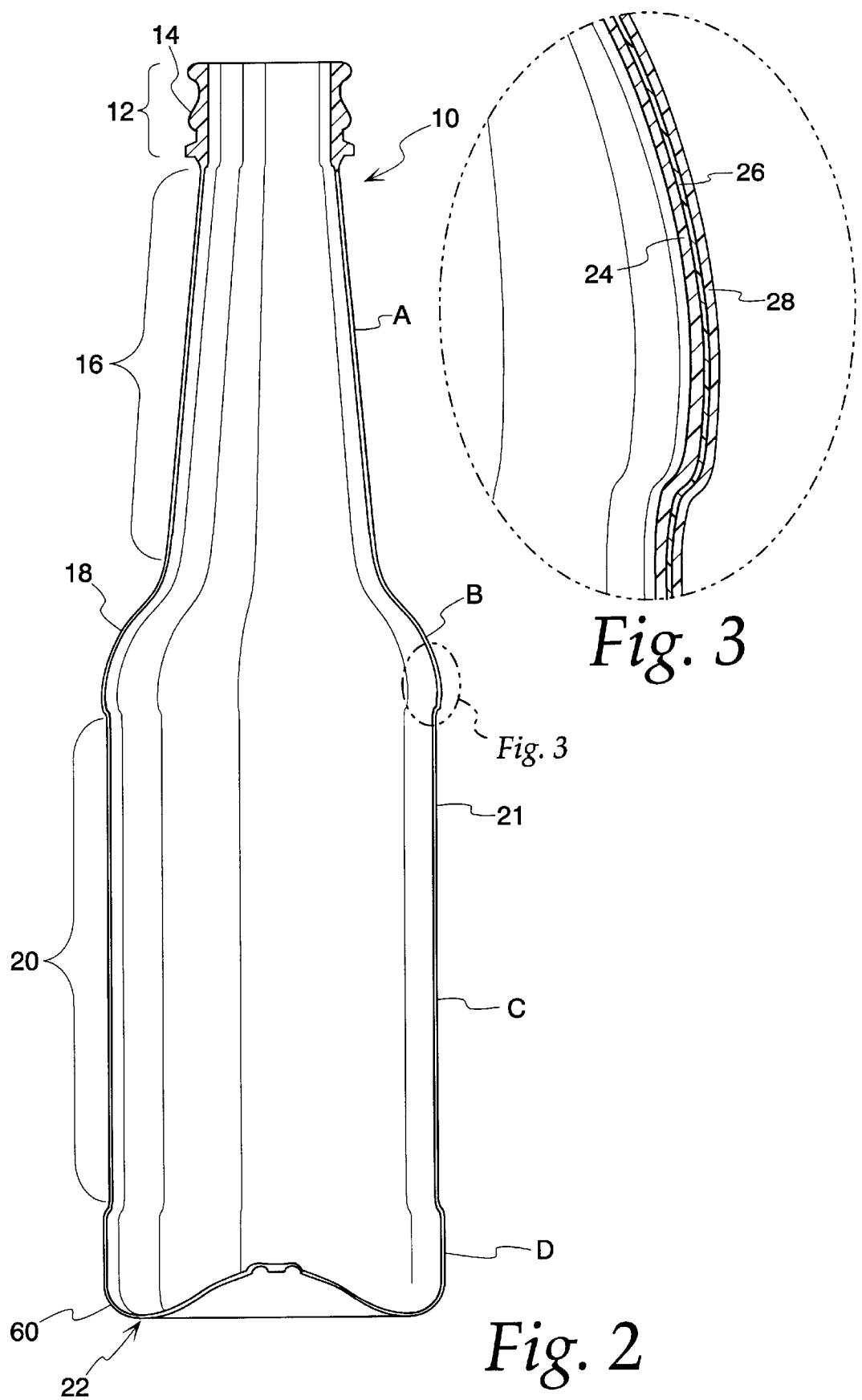
FIG. 2 is a cross sectional view of the container shown in FIG. 1.
FIG. 3 is an enlarged drawing of a portion of the cross sectional view shown in FIG. 2.

As best illustrated in the cross-sectional views of the bottle 10 shown in FIGS. 2 and 3. The bottle 10 is constructed of three layers, namely an inner layer 24, a middle layer 26 and an outer layer 28. Both the inner layer 24 and the outer layer 28 are made of polyester (PET). The middle layer 26 is made of ethylene vinyl alcohol (EVOH). The middle layer 26 of EVOH provides oxygen and $CO_2$ barrier resistance which allows a product to be stored within the bottle 10 for a period of time without spoiling. Note however, that EVOH is more costly than PET and it is desired to use as little EVOH as needed to preserve the product for its predicted shelf life. The bottle 10 of the present invention has a relatively thick layer of EVOH compared to generally known commercial multilayer containers having EVOH and is designed especially for use with products requiring a relatively great amount of oxygen barrier protection such as many European beers.

Figure 4:
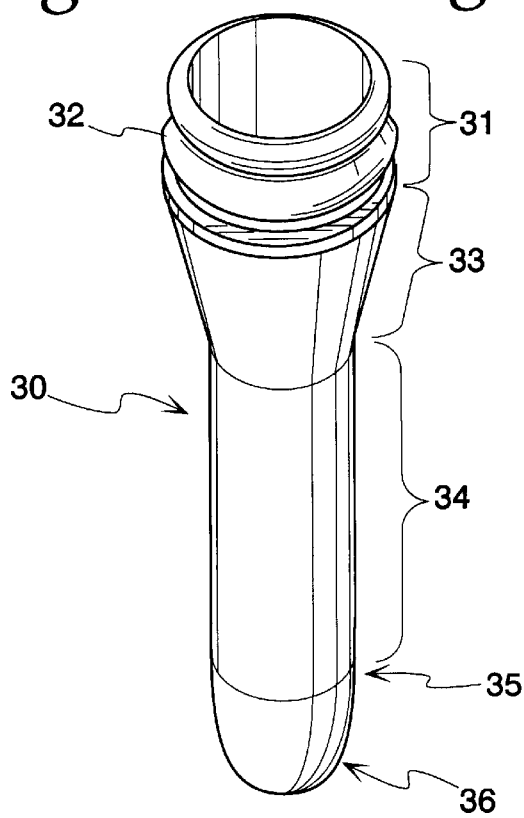
FIG. 4 is a perspective view of a multilayer preform of the present invention.

The bottle 10 is blow molded from a preform 30 (FIG. 4), by using conventional blow molding techniques. The preform 30 is made by an injection molding process such as the injection molding process described in U.S. Pat. No. 4,511,528, which is hereby incorporated by reference. The process used to make the preform 30 will be described in more detail below.

The preform 30 has a top portion 31 having a crown finish 32. Beneath the crown finish 32 is a rounded neck portion 33 which tapers into a body portion 34. At a lower end 35 of the body portion 34 is a bottom 36 of the preform 30.

Figure 5:
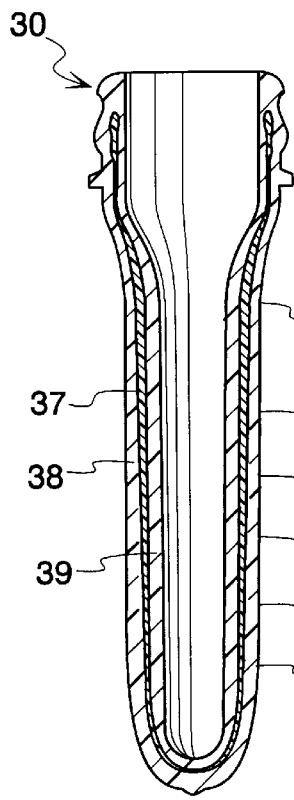
FIG. 5 is a cross sectional view of the multilayer preform shown in FIG. 4.
Figure 6:
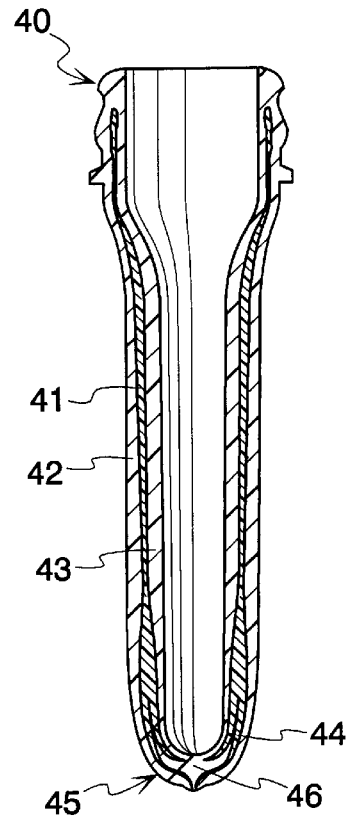
FIG. 6 is a cross sectional view of a multilayer preform having a defective middle layer.
Figure 7:
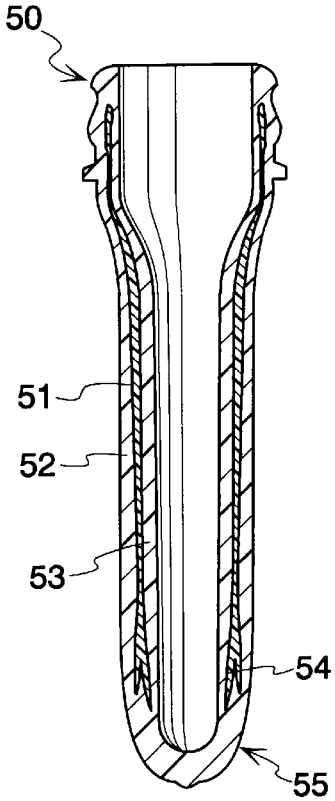
FIG. 7 is a cross sectional view of another multilayer preform having a defective middle layer.

A cross section of the preform 30 according to the present invention is shown in FIG. 5. In FIGS. 6 and 7 cross sections of preforms 40 and 50, respectively, are shown which do not have tapered layers of EVOH and are not made according to the present invention.

Referring now to FIG. 5, the preform 30 has a tapered layer of EVOH 37 between two layers of PET 38 and 39. The process by which this preform 30 is made will be described in detail below. The layer of EVOH 37 is uniformly thick throughout most of the body portion 34 of the preform, but tapers as it reaches the lower portion 35 of the body portion 24. This tapering of the EVOH layer provides the advantage of saving costly EVOH while still providing an excellent oxygen and $CO_2$ barrier layer as well as even distribution of the EVOH through the bottle 10 blown from the preform 30. Also, the tapered end of the EVOH near the bottom of the preform creates a bottle having a thicker layer of PET at the rounded portion 60 and bottom 22 of the bottle. The thicker layer of PET creates a stronger bottom profile that has more resistance to internal pressures from carbonated beverages stored therein.

As shown in FIG. 5, the preform 30 has a total length of approximately 4.0 inches and has a generally uniform overall total wall thickness of approximately 185 mils. The thickness of the layer of EVOH 37 at point A, approximately 1.75 inches from the top of the preform 30, is approximately 25 mils thick around the circumference of the preform 30. At point B, which is approximately 2.25 inches, from the top of the preform 30, the EVOH is approximately 20 mils thick around the circumference of the preform 30. At point C, which is approximately 2.50 inches, from the top of the preform 30, the EVOH layer 37 is approximately 15 mils thick around the circumference of the preform 30. At point D which is approximately 2.75 inches from the top, the EVOH layer 37 is approximately 12 mils thick around the circumference of the preform 30. At point E which is approximately 3.00 inches from the top, the EVOH layer 37 is approximately 10 mils thick around the circumference of the preform 30. At point F which is approximately 3.25 inches from the top, the EVOH layer 37 is approximately 5 mils thick around the circumference of the preform 30.

Note that the bottle 10 which is blown from the preform 30 has an approximately uniform total average wall thickness of approximately 11–13 mils throughout the body portion 20 of the bottle 10. The EVOH layer within the bottle 10, like the layer of EVOH within the preform 30 tapers slightly from the top of the body portion 20 towards the bottom 22 of the bottle 10 also. For example, the thickness of the EVOH layer 26 around the circumference of the bottle 10 at point A which is approximately 6.6 inches from the bottom 22 of the bottle 10 (See FIG. 2), is approximately between 2.2–3.6 mils thick. The thickness of the EVOH layer 26 around the circumference of the bottle 10 at points B and C which are approximately 4.450 and 2.20 inches from the top of the bottle, respectively, is approximately between 1.2–1.7 mils thick and has an average thickness of approximately 1.475 mils thick. The thickness of the EVOH layer 26 around the circumference of the bottle at point D which is approximately 0.4450 inches from the bottom 22 of the bottle 10 is approximately between 1.1 and 2.0 mils thick and has an average thickness of approximately 1.35 mils.

The taper in the EVOH layer 26 near the bottom 22 of the bottle 10 helps create a strong bottom profile that can withstand the internal pressure created by a carbonated beverage. If there is too much EVOH 26 in a rounded portion 60 between the body portion 20 of the bottle 10 and the bottom 22, the rounded portion 60 can be weak and will buckle when the bottle 10 is pressurized with a carbonated beverage.

FIG. 6 is a cross section of a defective preform 40 also having a layer of EVOH 41 between two layers of PET 42 and 43. The layer of EVOH 41 has a "fork tail" 44 and forms a "pool" of EVOH 46 near a bottom 45 of the preform 40. The preform 40 will not form a commercially acceptable container when blow molded and uses more EVOH than preforms and bottles of the present invention.

FIG. 7 is a cross section of another defective preform 50 having a layer of EVOH 51 between two layers of PET 52 and 53. As shown, the layer of EVOH 51 has a "fork tail" 54. The preform 50 shown in FIG. 7 will not form a commercially acceptable container when blow molded either.

The "fork tail" at the end of the stream of EVOH is not desirable because when the preform is blown into a bottle, the fork tail causes inconsistencies in the blow molding process such as uneven distribution of material. Uneven distribution of material can cause a the container to have a malformed bottom profile which in turn can cause weakness in the bottom of the bottle making it subject to deformation and unevenness.

When making a preform by the injection molding process, one of the last steps of the process is called "packing" the preform, which entails adding additional PET to the bottom of the preform without coinjecting any more EVOH. Packing the preform helps to distribute the EVOH and to seal the EVOH within the two layers of PET. However, it has been found that with conventional coinjection molding techniques, the packing process creates the "fork tails" 44 and 54 and the pool 46 shown in FIGS. 6 and 7 in preforms having thicker layers of EVOH (approximately 20–30 mils).

In the coinjection molding techniques used in FIGS. 6 and 7, the flows of EVOH are shut off from their maximum flow rates at different predetermined points. The preform 40 of FIG. 6 is made by shutting off the stream of EVOH at a predetermined time during the injection molding process prior to packing the preform 40 with additional PET. The preform 50 of FIG. 7 is created by shutting off the stream of EVOH at a later time than in the preform of FIG. 6 and only just before the preform 50 is packed with additional PET.

A solution to this problem was found in the new injection molding technique which uses a continuous flow of EVOH in which the flow of EVOH is slowed, but not stopped. The stream of PET is continuous and is never shut off completely until the preform is packed. Certain specified parameters, such as the shot size of the EVOH or the injection speed of the EVOH, during the injection process are controlled to achieve the tapered layer of EVOH. One such example is described below:

| | | | |
|---|---|---|---|
| Total Bottle Weight: | 28.1 grams | Material 1: | Hoechst 86H |
| Color: | CM 84-776-1 | Material 2: | Evalca LC-E105A |
| Overview | | Ext. B (EVOH) | |
| | | | |
| Cycle Time: | 38.6 sec. | Inject Delay: | 0.8 sec. |
| Clamp Set Up | | Inject High: | 6 sec. |
| | | | |
| Fast: | 20 in./sec. | Pack: | 0 sec. |
| Intermediate: | 10 in./sec. | Hold: | 3 sec. |
| Mold Protect: | 225 PSI | Cooling: | 12 sec. |
| Slow Down 1: | 19.5 in. | Extruder Delay: | 1 sec. |
| Slow Down 2: | 17 in. | Injection Velocity | |
| Close Limit: | 14.72 in. | Profile (PET) | |
| | | | |
| Open Limit: | 26 in. | Cushion: | 0.1 in. |
| Slow Down: | 23 in. | Cushion: | 0.2 in. actual |
| Fast: | 21 in. | X-fer: | 0.35 in. |
| Fast: | 20 in./sec. | Shot Size: | 0.9 in. |
| Breakaway: | 9 in./sec. | Speed 2: | in./sec. |
| High Tonnage: | 40 tons | Speed 1: | 1.5 in./sec. |
| Low Tonnage: | 30 tons | Ext. B (EVOH) | |
| | | | |
| Ejector Set Up | | Cushion: | 0 in. |
| | | | |
| Start Eject: | 20 in. | X-fer: | 0 in. |
| Pulse(s): | 1 | Shot Size: | 0.45 in. |
| Retract Limit: | 0.03 in. | Speed 1: | 0.5 in./sec. |
| Retract: | 4 in./sec. | Speed 2: | in./sec. |
| Intermediate: | 0.1 in. | %: | % |
| Fwd. Speed 1: | 3.7 in./sec. | Fill Time: | 3.2 sec. |
| Fast Fwd.: | 0.5 in. | Pack And Hold | |
| Dwell 1: | 0 sec. | Pressure (PET) | |
| | | | |
| Fwd. Speed 2: | 3.7 in./sec. | Fill High Limit: | 625 PSI |
| Forward: | 4.15 in. | Pack: | 14 sec. |
| Dwell 2: | 0.2 sec. | Pack: | 375 PSI |
| Temp. Set Up | | Hold: | 0 sec. |
| | | | |
| Nozzle: | 550 F. | Hold: | 0 psi |
| Nozzle Valve: | 90 F. | Ext. B (EVOH) | |
| | | | |
| Zone 1: | 550 F. | Fill High Limit: | 1000 PSI |
| Zone 2: | 550 F. | Pack: | 0 sec. |
| Zone 3: | 550 F. | Pack: | 0 PSI |
| Alarm Band: | 20% | Hold: | 3 sec. |
| Oil Temp: | 110 F. | Hold: | 400 PSI |
| Ext. B | | RPM And | |
| | | | |
| Nozzle: | 390 F. | Pressure (PET) | |
| | | | |
| Zone 1: | 410 F. | Decompress: | 0.1 in. |
| Zone 2: | 410 F. | Shot Size: | 0.9 in. |
| Zone 3: | 405 F. | Screw Speed: | 50 RPM |
| Alarm Band: | 20% | Back Pressure: | 0 PSI |
| Oil Temp: | 90 F. | Ext. B (EVOH) | |
| | | | |
| Mold Heats | | Decomp. Before: | 0.18 in. |
| | | | |
| 1: | 550 F. | Decomp. After: | 0.01 in. |
| 2: | 440 F. | Shot Size: | 0.45 in. |
| 3: | 530 F. | Screw Speed: | 150 RPM |
| Cycle Timers | | Back Pressure: | 0 PSI |
| (PET) | | Dried 4 hrs. @ | 320 F. |
| | | | |
| Cycle Limit: | 50 sec. | Chiller Temp: | 40 F. |
| Inject High: | 8 sec. | Ejector Blocks: | 1.25 in. |
| Fill: | 1.95 sec. | Ambient Temp: | 72 F. |
| Pack: | 14 sec. | Color Setting: | 4.7 |
| Hold: | 0 sec. | | |
| Cooling: | 18 sec. | | |
| Extruder Delay: | 0 sec. | | |

The injection molding process and parameters set forth below describe how to make an injection molded preform of the present invention using Hoechst 86H PET resin, Evalca LC-E105 EVOH resin and Color Matrix color CM 84-776-4 on a Cincinnati Milacron injection molding machine that has been modified to add a second injection unit and using a PET barrel with a diameter of 1.625 inches and an EVOH barrel with a diameter of 0.71 inches.

As indicated on the process specifications above, the shot size of the PET is 0.90 inches and the PET is injected into a preform mold through a manifold at 0.30 inches/second for 1.95 seconds. Pressure is then maintained at 375 psi for 14 seconds to pack the preform. The PET cushion is 0.20 inches and the PET barrel temperature is approximately 550°.

The shot size of the EVOH is 0.45 inches. The EVOH injection begins 0.80 seconds after the beginning of the PET injection. EVOH is injected into the preform mold through a manifold at a speed of 0.50 inches/second for 3.2 seconds. Then the pressure of 400 psi is maintained for 3.0 seconds. The EVOH cushion is 0.0 inches and the EVOH barrel temperature is approximately 400°. The taper is created by selecting the proper shot size, injection speed and pressure to create the desired taper. One way in which the taper is created is simply by selecting a smaller shot size and allowing material to continue to flow through the nozzle as the injection pressure of the EVOH is decreased from 400 psi to 0 psi. Alternatively, or in conjunction with the above, the speed at which the EVOH is injected into the mold can be varied from, for example 0.5 inches/second to 0.25 inches/second during the EVOH injection to create a tapered layer of EVOH. Note that the flow of PET is continuous throughout the injection process and is never completely shut off thus causing the desired EVOH distribution.

By slowing, but not completely shutting off the flow of EVOH, the preform 30 has a layer of EVOH that is thicker near the upper portion of the body 39 of the preform 30 uniform through the middle section of the preform and then tapers to a thinner layer of EVOH near the bottom portion of the preform 30.

The tapered distribution of the EVOH still provides a uniform color throughout the bottle. More importantly, the bottle 10 has a layer of EVOH 26 sufficient for oxygen and $CO_2$ barrier protection for products requiring greater amounts of oxygen and $CO_2$ barrier protection.

Additionally, as described above with respect to the process sheet above, color has been added to the layers of PET 38 and 39 used to form the preform 30 of the present invention. The color added is highly concentrated so that the color of the PET 38 and 39 in the blown bottle 10 is dark enough to greatly reduce the product in the bottle being exposed to light. It is important that the color used be of such a high concentration so that a minimal amount of color is added that will not affect the flow or strength characteristics of the PET 38 and 39. In the preform 30, the color that is added is made by Color Matrix Corporation in Cleveland Ohio and is known as color number 84-776-4. This color is added at such a low volume that the stream of PET 38 and 39 contain approximately between 0.15% to 0.25% of color.

From the foregoing description, it will be apparent that the plastic container of the present invention has a number of advantages, some of which have been described above and others of which are inherent in the present invention. Also, it will be understood that modifications can be made to the plastic container of the present invention without departing from the teachings of the invention. Accordingly the scope of the invention is only to be limited as necessitated by the accompanying claims.

What is claimed is:

1. A multilayer plastic container comprising:
   a neck portion;
   a body portion, adjacent said neck portion, forming a cylindrical wall; and a bottom portion adjacent said body portion opposite said neck portion;

wherein said cylindrical wall comprises a first layer of PET, a layer of EVOH adjacent said first layer of PET and a second layer of PET adjacent said layer of EVOH, whereby said layer of EVOH extends substantially parallel to the cylindrical wall and an average thickness of said layer of EVOH is greater near said neck portion of said container than near said bottom portion of said container, and wherein the thickness of said layer of EVOH in said body portion of said container tapers from a total thickness of approximately 2.2 to 3.6 mils in said neck portion of said container to approximately 1.1 to 2.0 mils thick near said bottom portion of said container.

2. A multilayer plastic container comprising:

a neck portion;

a body portion, adjacent said neck portion, forming a cylindrical wall; and a bottom portion adjacent said body portion opposite said neck portion;

wherein said cylindrical wall comprises a first layer of PET, a layer of EVOH adjacent said first layer of PET and a second layer of PET adjacent said layer of EVOH, and whereby said layer of EVOH extends substantially parallel to the cylindrical wall and an average thickness of said layer of EVOH is greater near said neck portion of said container than near said bottom portion of said container, wherein the average thickness of said layer of EVOH in said body portion of said container tapers from an average thickness of at least approximately 2.2 mils near said neck portion of said container to approximately 1.35 mils near said bottom portion of said container.

3. A multilayer plastic container comprising:

a neck portion;

a body portion, adjacent said neck portion, forming a cylindrical wall; and a bottom portion adjacent said body portion opposite said neck portion;

wherein said cylindrical wall comprises a first layer of PFT, a layer of EVOH adjacent said first layer of PET and a second layer of PET adjacent said layer of EVOH, whereby said layer of EVOH extends substantially parallel to the cylindrical wall and an average thickness of said layer of EVOH is greater near said neck portion of said container than near said bottom portion of said container, and wherein said cylindrical wall of said body portion of said container has an average thickness of approximately 11–13 mils, wherein the average thickness of said layer of EVOH in said body portion of said container tapers from approximately 1.475 mils to approximately 1.35 mils.

4. A multilayer plastic container comprising:

a neck portion;

a body portion, adjacent said neck portion, forming a cylindrical wall; and a bottom portion adjacent said body portion opposite said neck portion;

wherein said cylindrical wall comprises a first layer of PET, a layer of EVOH adjacent said first layer of PET and a second layer of PET adjacent said layer of EVOH, whereby said layer of EVOH extends substantially parallel to the cylindrical wall and an average thickness of said layer of EVOH is greater near said neck portion of said container than near said bottom portion of said container, and wherein said container has a bottom formed in said bottom portion of said container and said cylindrical wall of said body portion of said container has an average thickness of approximately 11–13 mils, said layer of EVOH having a thickness of approximately between 2.2–3.6 mils at a distance of approximately 4.45 and 2.0 inches from the bottom and a thickness of approximately between 1.1 to 2.0 mils at a distance of approximately 0.4450 inches from the bottom.

5. A multilayer plastic container made from a multilayer plastic preform, said container comprising:

a neck portion;

a body portion, adjacent said neck portion, defining a cylindrical wall; and a bottom portion adjacent said body portion opposite said neck portion, wherein said cylindrical wall comprises an outer layer, an inner layer and an intermediate layer between said outer layer and said inner layer, and whereby an average thickness of said intermediate layer is greater at a first position adjacent to an upper end of said cylindrical wall than at a second position adjacent to a lower end of said cylindrical wall.

wherein said inner layer and said outer layer have substantially the same thickness.

* * * * *